Patented July 1, 1947

2,423,200

UNITED STATES PATENT OFFICE 2,423,200

MANUFACTURE OF LACTAMS

Robert Wighton Moncrieff and Donald Peter Young, Spondon, near Derby, England, assignors to British Celanese Limited, London, England, a company of Great Britain No Drawing. Application December 23, 1943, Serial No. 515,426. In Great Britain February 24, 1943

6 Claims. (Cl. 260—239)

This invention relates to the manufacture of lactams, i. e. cyclic compounds containing the group —CO—NH— in the ring.

Lactams may be produced from the oximes of cyclic ketones by intra-molecular rearrangement. For example, the oxime of cyclopentanone may be converted into alpha-piperidone, and the oxime of cyclo-hexanone may be converted into epsilon-caprolactam. It is thus possible to convert cyclic ketones into cyclic compounds in which the ring has been enlarged by the introduction of a nitrogen atom.

In order to effect such rearrangement, the oxime may be heated with sulphuric acid. For instance the oxime may be heated with aqueous sulphuric acid of relatively high concentration, e. g. about 80 to 85%, and fairly good yields can be obtained by this method. The temperature however should be maintained within narrow limits; for example, the treatment of cyclopentanoxime and cyclohexanoxime requires a temperature lying between about 140° C. and 155° C. The reaction is exothermic, and if the temperature is allowed to rise above 155° C. it becomes violent and decomposition sets in. If on the other hand the temperature falls below 140° C. the reaction becomes erratic; sometimes it will not go to completion at all, while at other times it tends to get out of control with a sudden and violent increase of temperature. This difficulty of control is clearly a serious defect in an otherwise useful process.

According to the present invention lactams are made by heating oximes of cyclic ketones with sulfuric acid diluted with at least an equal volume of acetic acid. The replacement of the 80–85% aqueous sulphuric acid previously used by mixtures of sulphuric and acetic acids of the concentration indicated causes the reaction to proceed more slowly and uniformly at a somewhat lower temperature.

The concentration of the sulphuric acid in the mixture is preferably considerably less than 50% by volume; a mixture containing 33% by volume of sulphuric acid gives rise to an easily controlled reaction, and also gives higher average yields of lactam than are obtained using either a mixture of equal volumes of sulphuric and acetic acids, or the 80–85% aqueous sulphuric acid which has previously been employed; still better yields are obtained by further reducing the concentration of the sulphuric acid, especially to 25 to 28% by volume.

In carrying out the new process the mixture of sulphuric acid and acetic acid may be heated under reflux to its boiling point, at about 130° C., and the oxime added thereto. The reaction is readily controlled by adjusting the rate of adding the oxime, in sharp contrast to the difficulty of control when using 80–85% aqueous sulphuric acid. When all the oxime has been added the mixture may be cooled at once, or the mixture may be heated under reflux for a short time, for example for 5–15 minutes, and then allowed to cool.

In order to isolate the lactam, the mixture may first be neutralised, for example by means of an aqueous solution of sodium carbonate or other alkali, and then extracted with a solvent for the lactam. For example, alpha-piperidone and epsilon-caprolactam may be removed from the neutralised solution by extraction with chloroform. The lactam may be obtained from the extract by evaporation of the solvent, and if desired may be further purified, for instance by distillation under reduced pressure.

The following examples illustrate without in any way limiting the invention:

Example I

A mixture comprising one part by volume of sulphuric acid and three parts by volume of acetic acid is introduced into a reaction vessel provided with a reflux condenser, and heated to its boiling point, i. e. to about 130° C. A quantity of cyclopentanoxime approximately equal to the weight of the sulphuric acid in the mixture is added in portions at such a rate that the mixture is kept in a state of gentle ebullition. When all the oxime has been added the mixture is kept at its boiling point for ten to fifteen minutes and is then allowed to cool.

The cold mixture is poured slowly into excess of sodium carbonate dissolved in water so as to neutralise the acid without causing any substantial rise in temperature. The resulting alkaline solution is then thoroughly extracted with chloroform, and the extract washed with water, dried over potassium carbonate and the chloroform distilled off. The alpha-piperidone remaining is purified by fractional distillation under reduced pressure.

Example II

Cyclohexanoxime is subjected to the action of a mixture of one part by volume of sulphuric acid with three parts by volume of acetic acid precisely as described in Example I in relation to the treatment of cyclopentanoxime. A good yield of epsilon-caprolactam is obtained.

The new process is also applicable to the conversion of other cyclic ketoximes into lactams, particularly cyclic ketoximes derived from cycloparaffinic hydrocarbons, e. g. the various methyl-cyclopentanoximes and methyl-cyclohexanoximes, as well as oximes of cyclic ketones having more atoms in the ring, for example cyclo-heptanoxime.

Having described our invention, what we desire to secure by Letters Patent is:

1. Process for the manufacture of lactams, which comprises heating under reflux a mixture of sulphuric acid with 2 to 3 times its volume of acetic acid, and adding to the heated mixture the oxime of a saturated aliphatic cyclic ketone at such a rate that the heat of reaction evolved causes the acetic acid to boil from the mixture.

2. Process for the manufacture of alpha-piperidone, which comprises heating under reflux a mixture of sulphuric acid with 2 to 3 times its volume of acetic acid to the temperature at which acetic acid boils from the mixture, and adding to the heated mixture cyclo-pentanoxime at such a rate that the heat of reaction evolved causes the acetic acid to continue to boil from the mixture.

3. Process for the manufacture of epsilon-caprolactam, which comprises heating under reflux a mixture of sulphuric acid with 2 to 3 times its volume of acetic acid to the temperature at which acetic acid boils from the mixture, and adding to the heated mixture cyclo-hexanoxime at such a rate that the heat of reaction evolved causes the acetic acid to continue to boil from the mixture.

4. Process for the manufacture of lactams, which comprises heating under reflux a sulphuric acid-acetic acid mixture containing 25-28% of sulphuric acid, and adding to the heated mixture the oxime of a saturated aliphatic cyclic ketone at such a rate that the heat of reaction evolved causes the acetic acid to boil from the mixture.

5. Process for the manufacture of alpha-piperidone, which comprises heating under reflux a sulphuric acid-acetic acid mixture containing 25-28% of sulphuric acid to the temperature at which acetic acid boils from the mixture, and adding to the heated mixture cyclo-pentanoxime at such a rate that the heat of reaction evolved causes the acetic acid to continue to boil from the mixture.

6. Process for the manufacture of epsilon-caprolactam, which comprises heating under reflux a sulphuric acid-acetic acid mixture containing 25-28% of sulphuric acid to the temperature at which acetic acid boils from the mixture, and adding to the heated mixture cyclo-hexanoxime at such a rate that the heat of reaction evolved causes the acetic acid to continue to boil from the mixture.

ROBERT WIGHTON MONCRIEFF.
DONALD PETER YOUNG.

REFERENCES CITED

The following references are of record in the file of this patent:

UNITED STATES PATENTS

| Number | Name | Date |
|---|---|---|
| 2,221,369 | Cass | Nov. 12, 1940 |
| 2,297,520 | Wiest et al. | Sept. 29, 1942 |